(12) United States Patent
Kaplan

(10) Patent No.: US 8,993,662 B2
(45) Date of Patent: Mar. 31, 2015

(54) ADHESIVE FOR TEXTILE REINFORCING INSERTS AND USE THEREOF

(75) Inventor: Andreas Kaplan, Chur (CH)

(73) Assignee: EMS-Patent AG, Domat/EMS (CH)

( * ) Notice: Subject to any disclaimer, the term of this patent is extended or adjusted under 35 U.S.C. 154(b) by 265 days.

(21) Appl. No.: 13/290,718

(22) Filed: Nov. 7, 2011

(65) Prior Publication Data

US 2012/0115993 A1    May 10, 2012

(30) Foreign Application Priority Data

Nov. 8, 2010    (EP) .................................... 10014383

(51) Int. Cl.
| | | |
|---|---|---|
| *C08K 3/00* | (2006.01) | |
| *C08J 5/04* | (2006.01) | |
| *C08J 5/06* | (2006.01) | |
| *C09J 175/04* | (2006.01) | |
| *C08L 75/04* | (2006.01) | |
| *C08G 18/80* | (2006.01) | |

(52) U.S. Cl.
CPC ............ *C08G 18/80* (2013.01); *C08G 18/8061* (2013.01); *C08G 18/8074* (2013.01); *C08J 5/06* (2013.01); *C08G 2150/20* (2013.01); *C08G 2170/80* (2013.01); *C08G 2380/00* (2013.01); *C08J 2375/04* (2013.01); *Y10S 156/91* (2013.01)
USPC ........... 524/196; 524/591; 524/318; 524/557; 524/560; 524/589; 156/910; 156/136; 156/60

(58) Field of Classification Search
CPC ............... C08K 3/00; C08J 5/04; C08J 5/06; C09J 133/064; C09J 175/04; C08L 2666/54; C08L 75/04; C08G 18/00; C08G 18/80; C08G 18/8061
USPC ......... 524/424, 591, 196, 318, 557, 560, 589; 156/139, 60
See application file for complete search history.

(56) References Cited

U.S. PATENT DOCUMENTS

| | | | |
|---|---|---|---|
| 4,381,332 A | | 4/1983 | Fulmer et al. |
| 4,477,619 A | | 10/1984 | Lattimer et al. |
| 4,569,963 A | | 2/1986 | Hisaki et al. |
| 4,740,528 A | | 4/1988 | Garvey et al. |
| 4,742,095 A | | 5/1988 | Markusch et al. |
| 5,959,027 A | | 9/1999 | Jakubowski et al. |
| 6,084,018 A | * | 7/2000 | Wildburg et al. ............. 524/424 |
| 6,482,889 B1 | * | 11/2002 | Kurz .............................. 524/589 |
| 6,506,832 B1 | | 1/2003 | Derian et al. |
| 7,705,088 B2 | | 4/2010 | Durairaj et al. |
| 2002/0193508 A1 | | 12/2002 | Derian et al. |
| 2004/0249062 A1 | | 12/2004 | Derian et al. |
| 2007/0205393 A1 | | 9/2007 | Durairaj et al. |
| 2007/0243375 A1 | | 10/2007 | Kohashi et al. |
| 2008/0300347 A1 | | 12/2008 | Kurz et al. |
| 2014/0135458 A1 | | 5/2014 | Kaplan |

FOREIGN PATENT DOCUMENTS

| | | | |
|---|---|---|---|
| CN | 1981083 A | | 6/2007 |
| CN | 101250251 A | | 8/2008 |
| CN | 101296974 A | | 10/2008 |
| CN | 101395195 A | | 3/2009 |
| DE | 199 13 042 A1 | | 10/2000 |
| EP | 0 137 427 A2 | | 4/1985 |
| EP | 0 739 961 A1 | | 10/1996 |
| EP | 0 835 891 A1 | | 4/1998 |
| EP | 1 038 899 A1 | | 9/2000 |
| EP | 2 159 241 A1 | | 3/2010 |
| EP | 2 450 389 A1 | | 5/2012 |
| JP | S42-002896 Y1 | | 2/1967 |
| JP | S59-093774 A | | 5/1984 |
| JP | H02-151619 A | | 6/1990 |
| JP | 09-328474 A | | 12/1997 |
| JP | 2000-303054 A | | 10/2000 |
| JP | 2009-528347 A | | 8/2009 |
| NZ | 228773 A | | 7/1991 |
| WO | WO 94/22935 A1 | | 10/1994 |
| WO | WO 02/50148 A2 | | 6/2002 |
| WO | WO 2007/100399 A1 | | 9/2007 |
| WO | WO 2010/085602 A1 | | 7/2010 |

OTHER PUBLICATIONS

European Patent Office, Extended European Search Report in European Patent Application No. 10014383.3 (Mar. 24, 2011).
New Zealand Intellectual Property Office, Examination Report in New Zealand Patent Application No. 596219 (Nov. 10, 2011).
European Patent Office, Office Action in European Patent Application No. 10 014 383.3 (Jun. 3, 2013).
Australian Patent Office, Patent Examination Report No. 1 in Australian Patent Application No. 2011239245 (Nov. 13, 2013).
European Patent Office, Office Action in European Patent Application No. 10 014 383.3 (Dec. 17, 2013).

(Continued)

*Primary Examiner* — James J Seidleck
*Assistant Examiner* — Deve E Valdez
(74) *Attorney, Agent, or Firm* — Leydig, Voit & Mayer, Ltd.

(57) ABSTRACT

The present invention relates to a pulverulent adhesive for textile reinforcing inserts, which is dispersible in water, for the production of reinforced rubber products. The adhesive thereby comprises an at least partially capped, low-molecular isocyanate, a wetting agent, a binder and also possibly further additives.

19 Claims, No Drawings

(56) References Cited

OTHER PUBLICATIONS

State Intellectual Property Office of the People's Republic of China, First Office Action in Chinese Patent Application No. 201110345102.3 (Dec. 25, 2013).

Intellectual Property Office of the Philippines, Substantive Examination Report in Philippine Patent Application No. 1/2011/000346 (May 22, 2014).

State Intellectual Property Office of the People'S Republic of China, Second Office Action in Chinese Patent Application No. 201110345102.3 (Jul. 31, 2014).

Mexican Institute of Intellectual Property, Official Action in Mexican Patent Application No. MX/a/2011/011604 (Sep. 26, 2014).

Mexican Institute of Intellectual Property, Official Action in Mexican Patent Application No. MX/a/2011/011604 (Nov. 26, 2014).

Taiwan Intellectual Property Office, Official Action in Taiwanese Patent Application No. 100138706 (Dec. 24, 2014).

Japanese Patent Office, Notification of Reasons for Rejection in Japanese Patent Application No. 2011-243095 (Dec. 15, 2014).

State Intellectual Property Office of the People's Republic of China, Third Office Action in Chinese Patent Application No. 201110345102.3 (Feb. 10, 2015).

Taiwan Intellectual Property Office, Official Letter of Pending Patent Application Under Examination in Taiwan Patent Application No. 100138706 (Dec. 24, 2014).

\* cited by examiner

ADHESIVE FOR TEXTILE REINFORCING INSERTS AND USE THEREOF

CROSS-REFERENCE TO RELATED APPLICATION

This application claims the benefit of European Patent Application No. 10 014 383.3, filed Nov. 8, 2010, the disclosure of which is incorporated herein by reference.

BACKGROUND OF THE INVENTION

The invention relates to a pulverulent adhesive for textile reinforcing inserts, which is dispersible in water, for the production of reinforced rubber products. The adhesive thereby comprises an at least partially capped, low-molecular isocyanate, a wetting agent, a binder and also possibly further additives.

In the production of fibre-reinforced rubber products, it has proved to be advantageous if an adhesive is used in order to improve the adhesive strength between the textile reinforcing insert and the rubber. The use of such an adhesive is important, in particular in the field of tyre cord and other highly stressed composite materials with reinforcing fibres. In particular for these fields of application, it is known from the state of the art to use resorcin-formaldehyde-latex systems (RFL) for bonding synthetic or natural fibres to rubber products. With respect to the method, the procedure can thereby take place either in a single-step or in a two-step method. In the case of the single-step method, impregnation of the reinforcing element with a mixture of RFL and an adhesive is implemented.

In the case of the two-step method, firstly impregnation of the reinforcing element with the adhesive is undertaken and, in a second step, the application of RFL is effected.

Adhesives specially coordinated for such methods are also already known from the state of the art.

DE 199 13 042 A1 describes an adhesive for the treatment of reinforcing inserts for the production of reinforced rubber products in the form of an aqueous dispersion. The adhesives are thereby based on isocyanates.

BRIEF SUMMARY OF THE INVENTION

It was the object of the present invention to provide adhesives in the form of freely-flowing, low-dust powders which are dispersible in water, the particle size being reduced.

This object is achieved by the adhesive having the features of claim 1 and the method for the production of an adhesive having the features of claim 19. The further dependent claims reveal advantage developments. In claim 22, a use according to the invention of the adhesive is indicated.

According to the invention, a pulverulent adhesive for textile reinforcing layers, which is dispersible in water, is provided, which adhesive consists of the following components:
(A) 35-95% by weight of at least one at least partially capped, low-molecular isocyanate,
(B) 0.1-10% by weight of at least one wetting agent,
(C) 5-40% by weight of at least one binder,
(D) 0-5% by weight of at least one catalyst and
(E) 0-10% by weight of at least one additive.
Proportions of the components (A) to (E) hereby add up to 100% by weight.

The term at least partially capped, low-molecular isocyanate includes both partially blocked, low-molecular isocyanates and completely blocked, low-molecular isocyanates. The terms capped or blocked thereby have the same meaning.

DESCRIPTION OF THE INVENTION

According to the invention, pulverulent adhesives which are dispersible in water could thus be provided for the first time. These flowable powders can be adjusted with respect to their particle size by thermal drying methods, in particular by spray drying, fluidised bed drying, fluid bed spray drying, fluid bed spray granulation or fluid bed drying. Influencing factors thereby are for example the height of the spray tower or the dwell time. The thermal drying can be effected both continuously and discontinuously. The first provision of flowable, low-dust, dispersible powders hence makes possible significantly better storage stability relative to aqueous dispersions, such as are described for example in DE 199 13 042 A1. Also significant advantages with respect to the handling ability of the adhesives according to the invention are associated therewith, e.g. no danger of de-mixing, no transport of superfluous weight, lower transport volumes, no freezing at temperatures below zero degrees Celsius, no settling as with dispersions and hence longer stability.

A preferred embodiment of the adhesive provides that this consists of the following components:
(A) 52 to 90% by weight of at least one at least partially capped, low-molecular isocyanate,
(B) 0.5 to 8% by weight of at least one wetting agent,
(C) 10 to 30% by weight of at least one binder,
(D) 0.1 to 5% by weight of at least one catalyst and
(E) 0.1 to 5% by weight of at least one additive.

A particularly preferred embodiment of the adhesive consists of:
(A) 61 to 84% by weight of at least one at least partially capped, low-molecular isocyanate,
(B) 1 to 6% by weight of at least one wetting agent,
(C) 15 to 25% by weight of at least one binder,
(D) 0.5 to 4% by weight of at least one catalyst and
(E) 0.2 to 4% by weight of at least one additive.

A further preferred embodiment provides that the dispersible powder has an average particle diameter in the range of 50 to 5,000 preferably in the range of 100 to 800 μm and particularly preferred in the range of 200 to 500 μm.

It is further preferred that the at least one low-molecular isocyanate to be capped, i.e. the isocyanate before the at least partial capping, has a molar mass of less than or equal to 500 g/mol, preferably in the range 90 to 400 g/mol and particularly preferred in the range of 150 to 300 g/mol.

Low-molecular isocyanates display, relative to polymeric isocyanates, higher reactivity, better dispersibility, simpler production and easier availability.

The adhesive comprises as low-molecular isocyanate to be capped, i.e. the isocyanate before the at least partial capping, preferably an aromatic, aliphatic or cycloaliphatic isocyanate. This is selected for particular preference from the group consisting of 4,4-diphenylmethane diisocyanate (4,4-MDI), 2,4-diphenylmethane diisocyanate (2,4-MDI), 3,4-diphenylmethane diisocyanate (3,4-MDI), 2,2-diphenylmethane diisocyanate (2,2-MDI), 2,3-diphenylmethane diisocyanate (2,3-MDI), 2,4-toluene diisocyanate, 2,6-toluene diisocyanate, 1-isocyanato-3-isocyanatomethyl-3,5,5-trimethylcyclohexane, 1,4-naphthalene diisocyanate (1,4-NDI), 1,5-naphthalene diisocyanate (1,5-NDI), isophorone diisocyanate (IPDI), hexamethylene diisocyanate (HDI) or mixtures hereof.

The at least one at least partially capped, low-molecular isocyanate is partially or completely blocked. There are used here as blocking agent, in particular compounds from the group consisting of monophenols, in particular phenol, resorcin, cresol, trimethylphenols or tert. butylphenols, lactams, in particular ε-caprolactam, δ-valerolactam or laurinlactam, oximes, in particular methylethylketoxime (butanone oxime), methylamylketoxime or cyclohexanone oxime, readily enol-forming compounds, in particular acetoacetic esters, acetylacetone or malonic acid derivatives, primary, secondary or tertiary alcohols, glycol ethers, secondary aromatic amines, imides, mercaptans, triazoles and also mixtures hereof.

Preferably, the at least one wetting agent is selected from the group consisting of anionic surfactants, cationic surfactants, non-ionic surfactants, amphoteric surfactants, silicon-containing surfactants, perfluoro surfactants, hydrophilically modified polyolefins and mixtures hereof.

The surfactants are preferably selected from the group consisting of soaps, alkyl benzene sulphonates, linear alkyl benzene sulphonates, alkane sulphonates, ester sulphonates, methylester sulphonates, sulphosuccinic acid derivatives, α-olefin sulphonates, alkyl sulphates, fatty alcohol sulphates, fatty alcohol ether sulphates, fatty alcohol polyglycol ether sulphates, fatty alcohol polyglycol ethers, dioctyl sodium sulphosuccinate, alkyl phenol polyglycol ethers, sorbitan fatty acid esters, ethoxylated sorbitan fatty acid esters, alkyl polyglucosides, fatty acid glucamides, fatty acid ethoxylates, fatty amine ethoxylates, ethoxylated triacylglyceroles, polyethylene glycol ethers which are alkylated on both sides, alcohol ethoxylates, nonylphenol ethoxylates, polyglycerol fatty acid esters, fatty acid alkanol amides, amine oxides, alkyldimethylamine oxides, alkylpolyglucosides, saccharose esters, sorbitan esters, fatty acid glucamides, fatty acid-N-methylglucamides, ampholytes, betaines, sulphobetaines, N-(acylamido-alkyl)betaines, N-alkyl-β-aminopropionates, N-alkyl-β-iminopropionates, salts of long-chain primary amines, quaternary ammonium salts, quaternary phosphonium salts, tertiary sulphonium salts, pyridinium salts, imidazolinium salts, oxazolinium salts, esterquats, polyalkylene glycols, alkoxylated polyalkylene glycols, polysulphones, poly(2-hydroxyalkyl acrylates), poly(2-hydroxyalkyl methacrylates), ethylene oxide-propylene oxide block copolymers, polyethylene glycols, polypropylene glycols, polyethylene oxide resins, polypropylene oxides, salts of oligophosphates, salts of polyphosphates and mixtures hereof.

The hydrophilically modified polyolefins are preferably selected from the group consisting of ethylene acrylic acid copolymers, ethylene methacrylic acid copolymers, ethylene methacrylic acid acrylate copolymers, ethylene acrylic acid acrylate copolymers, ethylene methacrylate copolymers, ethylene acrylate copolymers, ethylene maleic acid copolymers, polyacrylic acid, polymethacrylic acid, polyacrylamide, polymethacrylamide, polyvinyl sulphonic acid, melamine formaldehyde sulphonates, naphthalene formaldehyde sulphonates, oxidated polyethylene, ethylene copolymers grafted with maleic acid, styrene-acrylate copolymers and mixtures or copolymers hereof.

The hydrophilically modified polyolefins thereby comprise preferably 5 to 40% by mol, preferably 10 to 30% by mol and particularly preferred 15 to 25% by mol, of a monomer carrying at least one hydrophilic group.

If salts are used as wetting agents, then the cations are preferably selected from the group consisting of sodium ions, potassium ions and ammonium ions.

The at least one binder is characterised by its binding capacity, water solubility and thermal resistance.

The binder has a thermal resistance up to a temperature of at least 120° C., preferably at least 140° C., particularly preferred at least 160° C.

The use of a binder, as is undertaken according to the invention, enables the provision of an adhesive in the form of a flowable, low-dust powder which is dispersible in water.

Preferably, the at least one binder is selected from the group consisting of vinyl alcohol-vinyl acetate copolymers, polyvinyl pyrolidones, polyvinyl alcohols, polyacrylic acid salts, salts of polyacrylic acid copolymers, polysaccharides, starch, cellulose, guar, tragacantine acid, dextrane, alginates and their carboxymethyl-, methyl-, hydroxyethyl-, hydroxypropyl derivatives, casein, soya protein, gelatines, lignin sulphonates and mixtures hereof.

In particular, the at least one binder is selected from the group consisting of polyvinyl alcohols, polyacrylic acid salts, salts of polyacrylic acid copolymers and mixtures hereof.

The polyvinyl alcohols have a hydrolysis degree of 75 to 90% by mol, preferably of 84 to 89% by mol, in particular of 86 to 89% by mol. In the case of hydrolysis degrees above 90% by mol, the water solubility drops.

The polymerisation degree of the polyvinyl alcohols is at 100 to 2,500, preferably at 250 to 2,000, particular preferred at 300 to 1,400, in particular at 400 to 1,100.

The average molar mass (weight average) of the polyvinyl alcohols is at 4,000 to 100,000 g/mol, preferably at 10,000 to 80,000 g/mol, particularly preferred at 12,000 to 56,000 g/mol, in particular at 16,000 to 44,000 g/mol.

In the case of polyacrylic acid copolymers, there are preferred copolymers with maleic anhydride, acrylic acid esters, methacrylic acid esters, styrene, norbornene derivatives and/or olefins. Amongst the olefins, ethane, propene, butene are preferred.

In the case of the polyacrylic acid salts and salts of polyacrylic acid copolymers, the cations are preferably selected from the group consisting of sodium ions, potassium ions, magnesium ions, calcium ions, tin ions, barium ions, lithium ions, zinc ions and mixtures thereof.

The at least one catalyst is preferably selected from the group of metal compounds of the metals sodium, potassium, caesium, strontium, silver, cadmium, barium, cerium, uranium, titanium, chromium, tin, antimony, manganese, iron, cobalt, nickel, copper, zinc, lead, calcium and/or zirconium. For particular preference, the at least one catalyst is selected from the group consisting of zinc acetate, zinc sulphate, zinc carbonate, zinc oxide, zinc acetylacetonate and/or zinc chloride.

The additive comprising at least one adhesive is selected preferably from the group consisting of defoamers, in particular long-chain alcohols, high-polymeric glycols, fatty acid ethoxylates, trialkyl methylamines, silicones or mixtures thereof, particularly preferred silicones in the form of silicone emulsions, colourants, in particular carbon black, fillers, in particular silicates, and also mixtures hereof.

According to the invention, a method for the production of the previously described adhesives is likewise provided. The production of the dispersion is effected by mixing the components listed in table 2 in an agitated tank with supply of the deionised water and the wetting additive with subsequent addition of the dispersion of the capped, low-molecular isocyanate, this being agitated. The remaining additives are added in succession, likewise with agitation. The dispersion is subsequently ground in a mill, preferably an agitator ball mill, to the desired particle size.

The fluid bed spray drying is implemented in a nitrogen atmosphere, a nitrogen temperature of 80° C. to 230° C., preferably of 120° C. to 190° C., particularly preferred of 140° C. to 180° C., being used. The pressure at which the dispersion is sprayed in is at 1 bar to 3 bar, preferably at 1.2 bar to 2 bar. The dispersion is metered in quantities of 1.5 g/min to 35,000 g/min, the quantity to be metered depending upon the unit size and the solid content of the dispersion. The higher the solid content, the higher is the metering quantity. The product temperature is adjusted as a function of the nitrogen temperature and metering quantity which are used. It should be in the range of 30° C. to 190° C., preferably of 50° C. to 120° C. The fluid bed is supplied in the form of already present product. Should this be impossible, it must be produced at the beginning of the drying from the dispersion to be dried. This is effected at a low metering rate. As soon as the fluid bed is present, the particles are built up with increasing metering rate. The formed particles show for example an onion- or bramble structure. The bramble structure being preferred since it disperses more easily.

According to the invention, the adhesives, as were described previously, are used for the treatment of reinforcing inserts for the production of reinforced rubber products. The adhesive according to the invention is suited in particular for textile reinforcing inserts, e.g. made of polyester, polyethylene, polyamide, rayon, cotton, bast fibres, sisal, hemp, flax or coconut fibres. These thus treated reinforcing inserts are used in particular for the production of tyre cord, conveyor belt, V-belt, mechanical rubber parts or composites.

The dispersion properties of the obtained powder are determined as follows:

In a beaker glass, deionised water is supplied and this is agitated with a magnetic agitator. The sample to be dispersed is added. The dispersibility is judged visually after 1 min and after 10 min and evaluated with numbers from 0 to 100, 0 meaning no dispersion and 100 complete dispersion.

The particle size distribution ($d_{50}$ and $d_{95}$ value) of the dispersion obtained after 10 min is determined by means of laser measurement according to ISO 13320. This is effected both without and with use of 30 s ultrasound.

For a good adhesive effect, the $d_{50}$ value should be at most 8 μm, preferably at most 5 μm, particularly preferred at most 2 μm.

For a good adhesive effect, the $d_{95}$ value should be at most 20 μm, preferably at most 10 μm, particularly preferred at most 5 μm.

The subject according to the invention is intended to be explained in more detail with reference to the subsequent examples without wishing to restrict said subject to the special embodiments shown here.

Table 1 shows the materials used in the examples and the comparative example.

TABLE 1

| Component | Trade name | Description | Manufacturer |
|---|---|---|---|
| low-molecular isocyanate | Grilbond IL-6 | low-molecular 4,4'-diphenylmethane diisocyanate capped with caprolactam, 50% by weight of aqueous dispersion | EMS-CHEMIE AG, Switzerland |
| wetting agent | Tamol NN 8906 | sodium salt of naphthalene sulphonic acid polycondensate, pulverulent particle size: 70% by weight in the range of 63-200 micrometres sodium sulphate content 6% | BASF, Germany |
| binder | Mowiol 4 - 88* | polyvinyl alcohol Mw** 31,000 87-89% hydrolised | Kuraray Europe GmbH, Germany |
| catalyst | — | Zinc acetylacetonate hydrate melting point 135-138° C. pulverulent | Sigma-Aldrich, Switzerland |
| defoamer | Dow Corning DSP Antifoam Emulsion*** | silicone-containing defoamer emulsion viscosity**** 1,500 mPas at 25° C. | Dow Corning, Belgium |

*used as 25% by weight of aqueous solution
**weight average of the molar mass in g/mol
***used as 10% by weight of aqueous solution
****Brookfield spindle No. 3 at 20 revolutions per minute The fluid bed spray drying of the dispersions was implemented on a fluid bed laboratory unit of the type WPF-Mini of the company DMR Prozesstechnologie (Dresden, Germany) in a nitrogen atmosphere. The following settings were thereby used:

Temperature nitrogen: 160° C.
Nitrogen throughput: 15-18 m$^3$/h
Spraying pressure: 1.5 bar
Metering rate dispersion: 1.5-7.5 g/min
Test duration: 2.5 h In the first phase of 1.5 h, the fluid bed was built up. Then the dispersion was sprayed at an increasing metering rate and the particles built up. During the test, a product temperature of 55-62° C. was set in the fluid bed. Particles with a bramble structure were formed.

Particle size: 200-350 μm
Residual moisture: 0.9%

Examples 1 and 2

In Table 2, the compositions of two adhesives according to the invention (examples 1 and 2) are listed.

TABLE 2

| | Example 1 | | Example 2 | |
|---|---|---|---|---|
| | as a dispersion parts by weight | as dry substance % by weight | as a dispersion parts by weight | as dry substance % by weight |
| low-molecular isocyanate 50% by weight of dispersion | 133 | 66.5 | 151.94 | 75.97 |
| wetting agent | 3.5 | 3.5 | 2.5 | 2.5 |
| binder 25% by weight solution | 120 | 30 | 100 | 20 |
| catalyst | — | — | 1.5 | 1.5 |
| additive (defoamer) 10% by weight of solution | — | — | 0.3 | 0.03 |
| water | 29.5 | — | 29.5 | — |
| solid content | 35% | 100% | 35% | 100% |

The $d_{50}$ or $d_{95}$ values of the particle size were, with the dispersion of example 1 without ultrasound, 1.0 or 2.1 μm and 1.0 or 2.0 μm with ultrasound.

The $d_{50}$ or $d_{95}$ values of the particle size were, with the dispersion of example 2 without ultrasound, 1.0 or 2.0 μm and 0.8 or 1.8 μm with ultrasound.

Comparative Example 3

In Table 3, the composition of a comparative example analogous to DE 199 13 042 A1 is indicated.

TABLE 3

|  | Comparative example 3 | |
| --- | --- | --- |
|  | as a dispersion parts by weight | as dry substance % by weight |
| low-molecular isocyanate 50% by weight of dispersion | 100 | 42.7 |
| wetting agent | 7 | 6 |
| low-molecular isocyanate, pulverulent | 60 | 51.3 |
| solid content | 70% | 100% |

The particle size of the dispersion, at $d_{50}$, was 0.9 and, at $d_{95}$, 2.3 μm.

The dispersion properties of the obtained product were tested according to the following procedure:

48.25 g deionised water was placed in a 100 ml beaker glass. Agitation took place on a magnetic agitator with a speed of rotation of 600 min$^{-1}$. 1.75 g of the sample to be dispersed was added. After 1 min and 10 min, the dispersibility was assessed. After 10 min agitation, the particle size distribution ($d_{50}$ and $d_{95}$ value) was measured with the Cilas 1064.

In Table 4, the results of the dispersion tests with the dry substances of examples 1 and 2 and of the comparative example 3 are summarised.

TABLE 4

|  | dry substance from | | | | | |
| --- | --- | --- | --- | --- | --- | --- |
|  | example 1 | | example 2 | | comparative example 3 | |
| dispersibility after | | | | | | |
| 1 min | 95 | | 96 | | 2 | |
| 10 min | 98 | | 99 | | 5 | |
| particle size [micrometres] after 10 min | $d_{50}$ | $d_{95}$ | $d_{50}$ | $d_{95}$ | $d_{50}$ | $d_{95}$ |
| without ultrasound | 1.2 | 4.5 | 1.1 | 4.3 | — | — |
| with ultrasound | 1.1 | 2.8 | 1.0 | 2.4 | — | — |

The dry substances from examples 1 and 2 display, with values between 95 and 99, excellent dispersion.

In the case of the particle size after 10 min dispersion, the dry substance from example 1, at the $d_{50}$ value with 1.2 or 1.1 μm (without or with ultrasound), again reaches almost the particle size of the original dispersion of 1.0 μm (without and with ultrasound). In the case of the $d_{95}$ value, the deviations from the original dispersion are in fact greater, with an average particle size of 4.5 or 2.8 (without or with ultrasound) however still very readily processible.

The dry substance of example 2 shows in the dispersion test, in every respect, still better values than those of example 1.

In the comparative example 3, the dispersibility of 2 or 5 shows that the dry substance produced from a dispersion according to DE 119 13 042 A1 does not have adequate dispersibility for practical application. Therefore the particle size measurement after 10 min dispersion was dispensed with.

The invention claimed is:

1. A pulverulent adhesive for textile reinforcing inserts, which is dispersible in water, consisting of
(A) 35-95% by weight of at least one at least partially capped, low-molecular isocyanate,
(B) 0.1-10% by weight of at least one wetting agent,
(C) 5-40% by weight of at least one binder,
(D) 0-5% by weight of at least one catalyst and
(E) 0-10% by weight of at least one additive,
the proportions of (A) to (E) adding up to 100% by weight, wherein the pulverulent adhesive is a dispersible powder having an average particle diameter in the range of 50 to 5,000 μm.

2. The adhesive according to claim 1, wherein the pulverulent adhesive consists of
(A) 52-90% by weight of at least one at least partially capped, low-molecular isocyanate,
(B) 0.5-8% by weight of at least one wetting agent,
(C) 10-30% by weight of at least one binder,
(D) 0.1-5% by weight of at least one catalyst and
(E) 0.1-5% by weight of at least one additive,
the proportions of (A) to (E) adding up to 100% by weight.

3. The pulverulent adhesive according to claim 1, wherein the at least one at least partially capped, low-molecular isocyanate has a molar mass of less than or equal to 500 g/mol.

4. The pulverulent adhesive according to claim 1, wherein the at least one at least partially capped, low-molecular isocyanate is an aromatic, aliphatic or cycloaliphatic isocyanate.

5. The pulverulent adhesive according to claim 4, wherein the at least one at least partially capped, low-molecular isocyanate is partially or completely blocked with a blocking agent.

6. The pulverulent adhesive according to claim 1, wherein the at least one wetting agent is selected from the group consisting of anionic surfactants, cationic surfactants, non-ionic surfactants, amphoteric surfactants, silicon-containing surfactants, perfluoro surfactants, hydrophilically modified polyolefins and mixtures thereof.

7. The pulverulent adhesive according to claim 6, wherein the surfactants are selected from the group consisting of soaps, alkyl benzene sulphonates, linear alkyl benzene sulphonates, alkane sulphonates, methylester sulphonates, α-olefin sulphonates, alkyl sulphates, fatty alcohol sulphates, fatty alcohol ether sulphates, fatty alcohol polyglycol ether sulphates, fatty alcohol polyglycol ethers, alkyl phenol polyglycol ethers, sorbitan fatty acid esters, ethoxylated sorbitan fatty acid esters, alkyl polyglucosides, fatty acid glucamides, fatty acid ethoxylates, fatty amine ethoxylates, ethoxylated triacylglyceroles, polyethylene glycol ethers which are alkylated on both sides, alcohol ethoxylates, nonylphenol ethoxylates, polyglycerol fatty acid esters, fatty acid alkanol amides, amine oxides, alkyldimethylamine oxides, alkylpolyglucosides, saccharose esters, sorbitan esters, fatty acid glucamides, fatty acid-N-methylglucamides, ampholytes, betaines, sulphobetaines, N-(acylamido-alkyl)betaines, N-alkyl-β-aminopropionates, N-alkyl-β-iminopropionates, salts of long-chain primary amines, quaternary ammonium salts, quaternary phosphonium salts, tertiary sulphonium salts, pyridinium salts, imidazolinium salts, oxazolinium salts, esterquats, polyalkylene glycols, alkoxylated polyalkylene glycols, polysulphones, poly(2-hydroxyalkyl acrylates), poly(2-hydroxyalkyl methacrylates), ethylene oxide-propylene oxide block copolymers, polyethylene glycols, polypropylene glycols, polyethylene oxide resins, polypropylene oxides, salts of oligophosphates, salts of polyphosphates and mixtures thereof.

8. The pulverulent adhesive according to claim 1,
wherein the at least one binder is selected from the group consisting of vinyl alcohol-vinyl acetate copolymers, polyvinyl pyrrolidones, polyvinyl alcohols, polyacrylic acid salts, salts of polyacrylic acid copolymers, polysaccharides, starch, cellulose, guar, tragacantine acid, dextrane, alginates and their carboxymethyl-, methyl-, hydroxyethyl-, hydroxypropyl derivatives, casein, soya protein, gelatines, lignin sulphonates and mixtures thereof.

9. The pulverulent adhesive according to claim 1,
wherein the at least one binder is selected from the group consisting of polyvinyl alcohols, polyacrylic acid salts, salts of polyacrylic acid copolymers and mixtures thereof.

10. The pulverulent adhesive according to claim 1,
wherein the at least one catalyst is selected from metal compounds of the metals sodium, potassium, caesium, strontium, silver, cadmium, barium, cerium, uranium, titanium, chromium, tin, antimony, manganese, iron, cobalt, nickel, copper, zinc, lead, calcium and/or zirconium.

11. The pulverulent adhesive according to claim 1,
wherein the at least one additive is selected from the group consisting of
defoamers, high-polymeric glycols, fatty acid ethoxylates, trialkyl methylamines, silicones or mixtures thereof,
colourants,
fillers,
and mixtures thereof.

12. A method for the production of a pulverulent adhesive according to claim 1, for textile reinforcing inserts, which is dispersible in water, having the following steps:
(a) producing a dispersion with agitation made of (A) 35-95% by weight of at least one low-molecular isocyanate, (B) 0.1-10% by weight of at least one wetting agent, (C) 5-40% by weight of at least one binder, (D) 0-5% by weight of at least one catalyst and (E) 0-10% by weight of at least one additive, the proportions of the components (A) to (E) adding up to 100% by weight.
(b) grinding the dispersion and
(c) drying the dispersion.

13. A method of producing textile reinforcing inserts or reinforced rubber products comprising utilizing a pulverulent adhesive according to claim 1 in the production of said textile reinforcing inserts or reinforced rubber products.

14. The pulverulent adhesive according to claim 2, wherein the pulverulent adhesive consists of
(A) 61-84% by weight of at least one at least partially capped, low-molecular isocyanate,
(B) 1-6% by weight of at least one wetting agent,
(C) 15-25% by weight of at least one binder,
(D) 0.5-4% by weight of at least one catalyst and
(E) 0.2-4% by weight of at least one additive,
the proportions of (A) to (E) adding up to 100% by weight.

15. The pulverulent adhesive according to claim 1 which is a dispersible powder having an average particle diameter in the range of 100 to 800 µm.

16. The pulverulent adhesive according to claim 15, which is a dispersible powder having an average particle diameter in the range of 200 to 500 µm.

17. The pulverulent adhesive according to claim 3, wherein the at least one at least partially capped, low-molecular isocyanate has a molar mass of less than or equal to 90 to 400 g/mol.

18. The pulverulent adhesive according to claim 4, wherein the at least one at least partially capped, low-molecular isocyanate is an aromatic, aliphatic or cycloaliphatic isocyanate selected from the group consisting of 4,4-diphenylmethane diisocyanate (4,4-MDI), 2,4-diphenylmethane diisocyanate (2,4-MDI), 3,4-diphenylmethane diisocyanate (3,4-MDI), 2,2-diphenylmethane diisocyanate (2,2-MDI), 2,3-diphenylmethane diisocyanate (2,3-MDI), 2,4-toluene diisocyanate, 2,6-toluene diisocyanate, 1-isocyanato-3-isocyanatomethyl-3,5,5-trimethylcyclohexane, 1,4-naphthalene diisocyanate (1,4-NDI), 1,5-naphthalene diisocyanate (1,5-NDI), isophorone diisocyanate (IPDI), hexamethylene diisocyanate (HDI) and mixtures thereof.

19. The pulverulent adhesive according to claim 5, wherein the at least one at least partially capped, low-molecular isocyanate is partially or completely blocked with a blocking agent selected from the group consisting of monophenols, lactams, oximes, enol-forming compounds, primary, secondary and tertiary alcohols, glycol ethers, secondary aromatic amines, imides, mercaptans, triazoles and mixtures thereof.

\* \* \* \* \*